Patented Oct. 25, 1927.

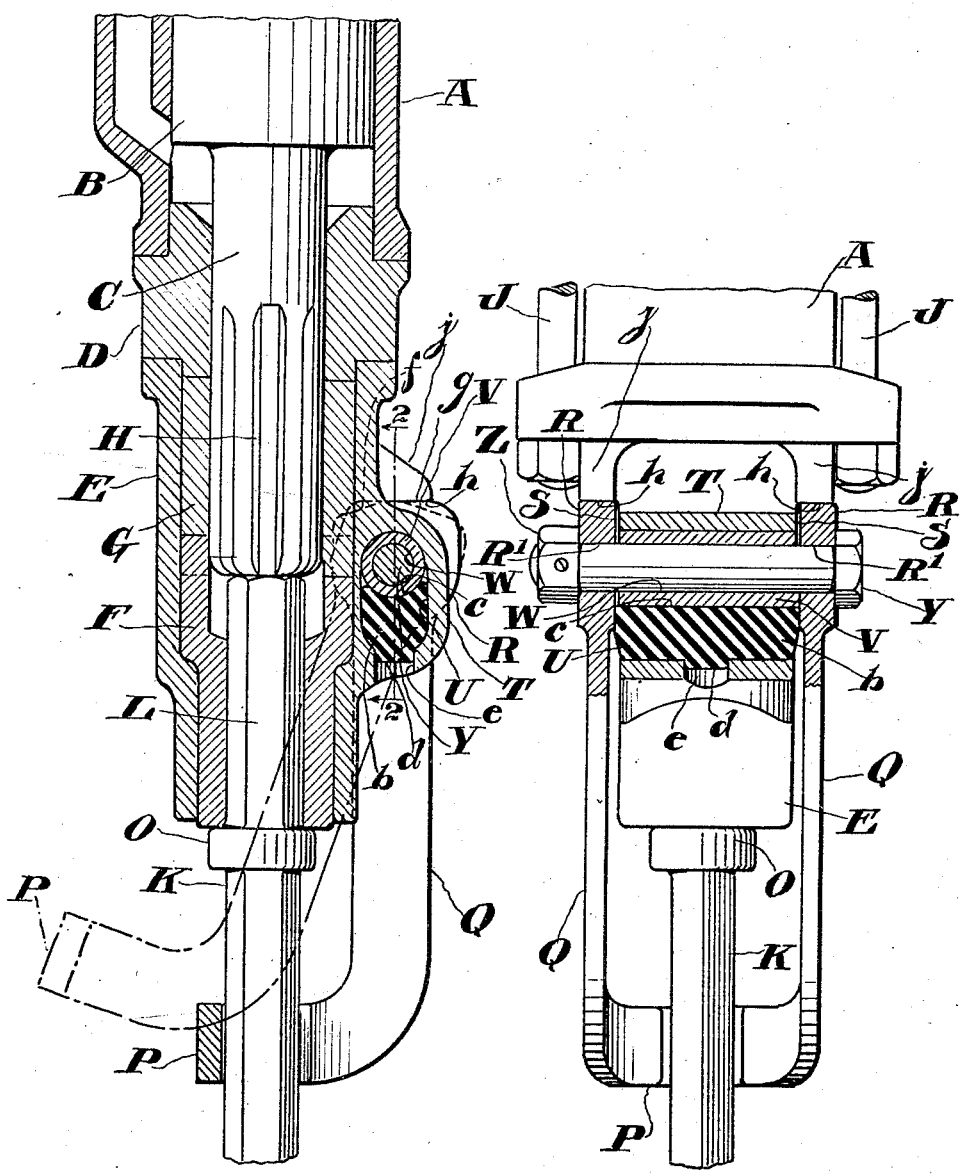

1,646,773

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

STEEL RETAINER.

Application filed October 9, 1926. Serial No. 140,589.

This invention relates to rock drills, but more particularly to the steel retainer for a fluid actuated rock drill of the hammer type.

The objects of the invention are to retain the drill steel in the front head of the rock drill and to eliminate the chances of breakage of the cushioning means utilized for absorbing the blows of the drill steel against the retainer.

Other objects will appear hereinafter.

The invention is shown in one of its preferred forms in the accompanying drawings, in which Figure 1 is a sectional elevation of the front end of a rock drill having the invention applied thereto, and Figure 2 is an elevation of the front end of a rock drill partly in section taken on the line 2—2 of Figure 1 looking in the direction of the arrows.

Referring more particularly to the drawings, A represents a cylinder of a rock drill in which is disposed a reciprocatory hammer piston B having a fluted forward extension C. A front cylinder extension D forms a closure for the front end of the cylinder A and is bored to slidably receive the extension C of the piston.

Connected operatively with the front cylinder extension D is a front head E which acts as a housing for the chuck mechanism, comprising in this instance a chuck F disposed rotatably in the front head and suitably interlocked with a fluted chuck nut G which interlocks slidably with flutes H in the piston extension C in a well known manner for imparting rotary movement of the piston to the chuck parts. Side bolts J arranged on opposite sides of the drill serve to hold the front head, the front cylinder extension and the cylinder securely in assembled position.

Disposed in the chuck F is a working implement or drill steel K, the shank L of which extends into the path of the hammer piston to receive the blows thereof. At the juncture of the drill steel K and the shank L is formed a collar O which abuts the front end of the chuck F for limiting the distance which the shank L may extend into the chuck F.

In order to prevent ejection of the drill steel K from the chuck F, a yoke P partly encircling the drill steel K is disposed about said drill steel forwardly of the collar O. The yoke has rearwardly extending side arms Q, the free ends R of which extend to ends S of an enlargement T formed on the side of the front head E and are provided with holes R' to register with an aperture U formed transversely in the enlargement T and in this instance of oblong cross sectional form.

In order to pivotally connect the yoke P to the front head, a sleeve V is inserted in the upper or rearward portion of the aperture U and has a bore W to receive a bolt Y, which bolt also extends through the holes R' of the side arms and is held in position by a nut Z.

To the end that the yoke P may be adequately protected against the severe blows of the collar O of the drill steel K against said yoke, a resilient member or rubber buffer $b$ is disposed in the forward end of the aperture U and is provided with a concave surface $c$ at its rearward side to conform with the shape of the sleeve V which it supports. The buffer $b$ is preferably of a length to extend from one side arm Q to the other and at the forward side of the buffer $b$ is formed a lug $d$ which extends into a hole $e$ in the enlargement T for holding the buffer $b$ against endwise movement.

In order that the yoke P may be securely held in either its retaining or releasing positions, the rearward ends of the side arms Q are provided with diverging inclined surfaces $f$ and $g$ adapted to seat against surfaces $h$ of lugs $j$ carried by the front head E. The point of convergence of the inclined surfaces $f$ and $g$ is preferably offset somewhat from the longitudinal axis of the holes R' in the side arms so that those inclined surfaces which contact with the surfaces $h$ of the lugs $j$ when the yoke is in retaining position, in this instance, the surfaces $g$, present the greater areas of contact.

By means of this construction, the buffer $b$ in addition to its function of absorbing the blows of the drill steel against the yoke P will also tend to press the inclined surfaces $f$ and $g$ firmly against the lugs $j$ for holding the said yoke in either its retaining or releasing positions.

In assembling the retainer on the front head, the buffer $b$ may first be placed in position in the aperture U, after which the sleeve V may be inserted in the upper portion of the aperture U to lie on the concave surface $c$ of the buffer. With these parts in position, the yoke P may then be placed in its assembled position and the bolt Y inserted through the side arms Q and the sleeve V.

In the operation of the device, whenever it is desired to remove the drill steel K from the front head E the yoke P may be rocked to the releasing position indicated in dot and dash lines in Figure 1. In this position, the yoke will be withdrawn from the path of the collar O of the drill steel, thus permitting the drill steel to be freely withdrawn from the front head E. After another drill steel has been inserted in the chuck F the yoke P may be rocked to its retaining position and will be securely held in this position by the rubber buffer $b$ acting to press the inclined surfaces $g$ of the side arms Q firmly against the surfaces $f$ of the lugs $j$.

I claim:

A steel retainer for a rock drill, comprising in combination with a front head and a collared drill steel, an enlargement on one side of the front head having an aperture of oblong cross sectional form, said aperture extending transversely to the axis of the front head, a yoke partly encircling the drill steel, side arms on the yoke having holes near their free ends, diverging inclined surfaces on the ends of the side arms, lugs on the front head forming seats for the inclined surfaces, a sleeve in the aperture, a bolt extending through the side arms and the sleeve for securing the yoke pivotally to the front head, and a rubber buffer in the aperture beneath the sleeve for absorbing the blow of the drill steel against the yoke and for pressing the inclined surfaces against the lugs, thereby holding the yoke in retaining and releasing positions.

In testimony whereof I have signed this specification.

FRED M. SLATER.